2,701,224

NEMATOCIDAL DICARBOTHIOIC ACID ESTER COMPOSITION AND METHOD OF APPLYING SAME

Roy E. Stansbury and Lyle D. Goodhue, Bartlesville, Okla., assignors to Phillips Petroleum Company, a corporation of Delaware No Drawing. Application January 2, 1952, Serial No. 264,645

25 Claims. (Cl. 167—22)

This invention relates to a nematocidal composition of matter, its preparation, and to a method of applying the same.

According to the invention, there are prepared and applied for the control or destruction of nematodes, compositions comprising esters of dicarbothioic acids. Nematodes are a class of unsegmented worms belonging to the phylum Nemathelminthes. Some species of this class of worms such as the root-knot nematode *Heterodera marioni* infest soil in which crops are planted and attack said crops and cause considerable damage thereto. It has been estimated that the annual loss in the United States due to such plant parasitic nematodes is several hundred million dollars.

We have found that esters of dicarbothioic acids, which esters can be represented by the general formula which follows, are effective agents for treating soil for the control of harmful nematodes contained therein.

Thus, esters of dicarbothioic acids useful in nematocidal compositions, prepared and applied according to this invention, can be represented by the general formula:

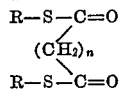

wherein $n$ is an integer in the range 0 to 2 inclusive and wherein the R's are selected from the group consisting of hydrogen, an alkyl group of not more than five carbon atoms, and an aryl group, to make up an ester.

Typical compounds applicable to use in the present invention, include dimethylthioloxalate, diethylthioloxalate, diethylthiolmalonate, dipropylthioloxalate, diethylthiolsuccinate, diisoamylthioloxalate, monoethylthioloxalate, diphenylthioloxalate, and the like.

These compounds as well as methods for their preparation are known in the art. They are usually prepared by interaction of an alkyl mercaptan or an alkyl mercaptide with a suitable dibasic acid chloride such as, for example, oxalyl chloride. The half-ester can be prepared by interaction of the dicarbothioic acid with a mercaptan or mercaptide.

Compounds of the present invention are usually employed for their intended purpose as a solution of a proper concentration in a suitable solvent which does not have a deleterious effect on said compounds. Suitable solvents include selected isoparaffinic hydrocarbon fractions known commercially as Soltrols, straight chain hydrocarbons containing not more than 12 carbon atoms, naphthas, deodorized kerosene, and the like. Solvents employed will boil in a temperature range from 150 to 400° F., preferably from 200 to 300° F., said solvents being so selected that they will readily permeate the soil and carry toxic concentrations of our nematocides therethrough.

Solutions prepared according to the manner of the present invention will contain our nematocides on a weight basis of from 0.001 to 20 per cent, preferably 1 to 15 per cent. These solutions will be applied to the soil in a suitable manner at a rate to provide from about 10 to about 60 lbs. of active ingredient per acre. However, when fumigating soil containing undecomposed plant materials containing galls of the root-knot nematode, it is frequently favorable to use a sufficient amount of solution to provide as much as 75 lbs. or more of active ingredient per acre.

Aqueous emulsions of compounds used in the present invention can be employed where it is desirable to drench soil such as in greenhouse benches and the like. However, injection into the soil is preferred for the usual applications.

The compositions of the present invention are applicable to the destruction of the root-knot nematode *Heterodera marioni*, *Rhabditis strongloids*, *Panagrellus* and others.

EXAMPLE I

*Nematocide tests using* Rhabditis strongyloids

Tests were conducted wherein diethylthioloxalate was made up as a 2 weight per cent aqueous emulsion using 0.5 weight per cent of Atlox 1045 A (polyoxyethylene sorbitol oleate-laurate emulsifying agent) as emulsifier. Preliminary tests proved that Atlox 1045 A was non-toxic to *Rhabditis strongyloids*. This 2 per cent emulsion was then diluted so that in the end there were four concentrations: 2.0, 0.2, 0.02, and 0.002 per cent.

One ml. of distilled water was placed in a 3⁄16 x 3 inch test tube and from twenty-five to fifty nematodes of the species *Rhabditis strongyloids* were then transferred to the test tube with a bamboo pick. To one ml. of water in the test tube containing the nematodes, one ml. of one of the concentrations of diethylthioloxalate, prepared as described above, was added. This procedure was repeated for the three other concentrations of the chemical. Since this was a 50–50 dilution, the final concentrations of the chemical were 1.0, 0.1, 0.01 and 0.001 per cent. Each test tube was stoppered and agitated mechanically for a period of two hours and then a mortality count was made. Results are recorded below:

*Nematocidal action of diethylthioloxalate against* Rhabditis strongyloids

| Run # | Percentage Mortality at Indicated Emulsion Concentration | | | |
|---|---|---|---|---|
| | 1.0% | 0.1% | 0.01% | 0.001% |
| I | 100 | 100 | 100 | 100 |
| II | 100 | 100 | 100 | 100 |

EXAMPLE II

The test procedure described in Example I was employed to determine the effectiveness of diethylthioloxalate at low concentrations against nematodes belonging to the genus *Panagrellus*. Results of these tests are recorded below:

*Nematocidal action of diethylthioloxalate against* Panagrellus

| Run # | Percentage Mortality at Indicated Emulsion Concentration | | |
|---|---|---|---|
| | 1.0% | 0.1% | 0.01% |
| I | 100 | 100 | 100 |
| II | 100 | 100 | 90 |

EXAMPLE III

It is the opinion of nematologists that a good nematocide should be volatile, slightly soluble in water, and should be able to penetrate nemic membranes. The stender [1] dish fumigation test, employed in the laboratory to test the properties described above, consists of placing nematodes in a very small drop of water in a B. P. I. (Bureau of Plant Industry) watch glass.[2] The B. P. I. watch glass is then placed in a stender dish that is 60 mm. in diameter and 28 mm. in height. A measured amount of the nematocide is then placed in the stender dish beside the watch glass and the dish is covered. Observations are made and mortality counts recorded after two hours. To kill the nematodes the chemical must first volatilize, then penetrate the water barrier and the nematodes.

---
[1] A small dish having a plate glass cover, ground for a vapor tight fit.
[2] Small Syracuse pattern watch glasses approximately 1 inch in diameter.

Two series of tests were run. In the first series 0.1 ml. of diethylthioloxalate was used and in the second series 0.005 ml. of diethylthioloxalate was used. Mortality counts were made after two hours in the first series and after one and one-half hours in the second series. Results of tests using diethylthioloxalate against root-knot nematodes *Heterodera marioni* are recorded below:

| | Milliliters of Chemical per Dish | Number of Nematodes Dead | Percent of Nematodes Dead | Remarks |
|---|---|---|---|---|
| Series I | 0.1 | 25 | 100 | |
| Series II | 0.005 | 84 | 88 | 100% dead after 2 hours. |

The foregoing tests show that the nematocidal compositions of the invention are effective to give excellent results even at low concentrations.

We claim:

1. A nematocidal composition of matter containing dissolved in a suitable solvent an ester of dicarbothioic acid, the said ester being represented by the general formula

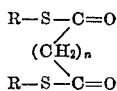

wherein $n$ is an integer in the range 0 to 2 inclusive and wherein the R's are selected from the group consisting of hydrogen, an alkyl group of not more than five carbon atoms, and an aryl group, to make up an ester.

2. A nematocidal composition of matter containing dissolved in a suitable solvent dimethylthioloxalate.

3. As a nematocidal composition, diethylthioloxalate in admixture with water and an emulsifying agent.

4. A nematocidal composition of matter according to claim 1 in which at least one compound represented by the said general formula is in admixture with an isoparaffinic hydrocarbon fraction, said fraction boiling in a temperature range of from about 150 to about 400° F.

5. A method of controlling nematodes which comprises contacting said nematodes with an ester of a dicarbothioic acid selected from the esters which can be represented by the general formula

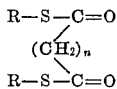

wherein $n$ is an integer in the range 0 to 2 inclusive and wherein the R's are selected from the group consisting of hydrogen, an alkyl group of not more than five carbon atoms, and an aryl group, to make up an ester.

6. A method of treating soil to control damage caused by nematodes therein which comprises applying to said soil dimethylthioloxalate.

7. A method of treating soil to control damage caused by nematodes therein which comprises injecting into the said soil an ester of a dicarbothioic acid which can be represented by the general formula

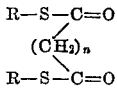

wherein $n$ is an integer in the range 0 to 2 inclusive and wherein the R's are selected from the group consisting of hydrogen, an alkyl group of not more than five carbon atoms, and an aryl group, to make up an ester.

8. A method according to claim 7 wherein the said ester is contained in a carrier vehicle selected from the group consisting of isoparaffinic hydrocarbon fractions boiling in the temperature range from 150° to 400° F.

9. The control of damage by nematodes which comprises the step of contacting said nematodes with diethylthioloxalate.

10. A nematocidal composition of matter containing admixed with a nematocide adjuvant as a carrier therefor diethylthioloxalate.

11. A nematocidal composition of matter containing admixed with a nematocide adjuvant as a carrier therefor diethylthiolmalonate.

12. A nematocidal composition of matter containing admixed with a nematocide adjuvant as a carrier therefor dipropylthioloxalate.

13. A nematocidal composition of matter containing admixed with a nematocide adjuvant as a carrier therefor diethylthiolsuccinate.

14. A nematocidal composition of matter containing admixed with a nematocide adjuvant as a carrier therefor diisoamylthioloxalate.

15. A nematocidal composition of matter containing admixed with a nematocide adjuvant as a carrier therefor monoethylthioloxalate.

16. A nematocidal composition of matter containing admixed with a nematocide adjuvant as a carrier therefor diphenylthioloxalate.

17. A method of treating soil to control damage caused by nematodes therein which comprises applying to said soil diethylthioloxalate, in an amount sufficient to render ineffective nematodes in said soil.

18. A method of treating soil to control damage caused by nematodes therein which comprises applying to said soil diethylthiolmalonate, in an amount sufficient to render ineffective nematodes in said soil.

19. A method of treating soil to control damage caused by nematodes therein which comprises applying to said soil dipropylthioloxalate, in an amount sufficient to render ineffective nematodes in said soil.

20. A method of treating soil to control damage caused by nematodes therein which comprises applying to said soil diethylthiolsuccinate, in an amount sufficient to render ineffective nematodes in said soil.

21. A method of treating soil to control damage caused by nematodes therein which comprises applying to said soil diisoamylthioloxalate, in an amount sufficient to render ineffective nematodes in said soil.

22. A method of treating soil to control damage caused by nematodes therein which comprises applying to said soil monoethylthioloxalate, in an amount sufficient to render ineffective nematodes in said soil.

23. A method of treating soil to control damage caused by nematodes therein which comprises applying to said soil diphenylthioloxalate, in an amount sufficient to render ineffective nematodes in said soil.

24. A method according to claim 7 wherein said ester is contained in a nematocide adjuvant as carrier therefor.

25. A nematocidal composition of matter according to claim 1 in which at least one compound represented by said general formula is in admixture with a nematocide adjuvant as carrier therefor.

References Cited in the file of this patent

UNITED STATES PATENTS 2,259,869     Allen     Oct. 21, 1941

OTHER REFERENCES

Ginsburg et al., Jour. of Economic Entomology, vol. 29, pp. 856 to 859 (1936).

Frear, Chemistry of Insecticides, Fungicides and Herbicides, 2d ed., published by D. Van Nostrand Co., Inc., pp. 108 to 128 (Sept. 1948).

Brown, Insect Control by Chemicals, published by John Wiley & Sons, Inc., pp. 64 to 68 (1951).